(12) United States Patent
O'Mahony et al.

(10) Patent No.: US 11,711,344 B2
(45) Date of Patent: Jul. 25, 2023

(54) SYSTEM AND METHOD FOR CREATING BUFFERED FIREWALL LOGS FOR REPORTING

(71) Applicant: Forcepoint LLC, Austin, TX (US)

(72) Inventors: Michael Oliver O'Mahony, Cork (IE); Nicole Carin Petersen, Cork (IE); Mandar Harish Harkare, Cork (IE); Damien Christopher Monaghan, Cork (IE)

(73) Assignee: FORCEPOINT LLC, Austin, TX (US)

( * ) Notice: Subject to any disclaimer, the term of this patent is extended or adjusted under 35 U.S.C. 154(b) by 402 days.

(21) Appl. No.: 16/862,655

(22) Filed: Apr. 30, 2020

(65) Prior Publication Data
US 2021/0344649 A1    Nov. 4, 2021

(51) Int. Cl.
| | | |
|---|---|---|
| G06F 21/00 | (2013.01) |
| H04L 9/40 | (2022.01) |
| G06F 11/34 | (2006.01) |
| G06F 9/48 | (2006.01) |
| G06F 11/30 | (2006.01) |
| G06F 9/451 | (2018.01) |

(52) U.S. Cl.
CPC .......... H04L 63/0263 (2013.01); G06F 9/451 (2018.02); G06F 9/4881 (2013.01); G06F 11/3086 (2013.01); G06F 11/3476 (2013.01); H04L 63/1425 (2013.01)

(58) Field of Classification Search
CPC ............ H04L 63/0263; H04L 63/1425; H04L 63/0227; G06F 9/451; G06F 9/4881; G06F 11/3086; G06F 11/3476; G06F 11/302; G06F 11/323; G06F 8/38
See application file for complete search history.

(56) References Cited

U.S. PATENT DOCUMENTS

| | | | |
|---|---|---|---|
| 6,606,710 B2 * | 8/2003 | Krishnan ............ | H04L 63/0227 726/13 |
| 7,152,242 B2 | 12/2006 | Douglas | |
| 7,398,311 B2 | 7/2008 | Joshi et al. | |
| 7,934,253 B2 | 4/2011 | Overcash et al. | |
| 8,347,392 B2 | 1/2013 | Chess et al. | |
| 8,578,490 B2 | 11/2013 | Moran | |

(Continued)

FOREIGN PATENT DOCUMENTS

TW    I364702 B    5/2012

OTHER PUBLICATIONS

Zerkane, S., Espes, D., Le Parc, P., Cuppens, F. (2016). Software Defined Networking Reactive Stateful Firewall. In: Hoepman, JH., Katzenbeisser, S. (eds) ICT Systems Security and Privacy Protection. SEC 2016. IFIP Advances in Information and Communication Technology, vol. 471. p. 119-132 (Year: 2016).*

*Primary Examiner* — Kendall Dolly
(74) *Attorney, Agent, or Firm* — Jackson Walker LLP; Christopher J. Rourk

(57) ABSTRACT

A system for firewall data log processing, comprising a firewall logging system operating on a first processor and configured to cause the first processor to receive firewall log data and to process the firewall log data on a periodic basis to reduce the size of the firewall log data and a firewall reporting system operating on a second processor and configured to process the reduced size firewall log data to generate a report on a user interface that includes one or more analytics from the reduced size firewall data.

20 Claims, 1 Drawing Sheet

(56) References Cited

U.S. PATENT DOCUMENTS

| | | | |
|---|---|---|---|
| 8,970,450 B2 | 3/2015 | Momchilov | |
| 9,055,093 B2 | 6/2015 | Borders | |
| 9,185,125 B2 | 11/2015 | Varsanyi et al. | |
| 9,619,651 B1 | 4/2017 | Leavy et al. | |
| 11,314,611 B2* | 4/2022 | Peddibhotla | G06F 16/2423 |
| 2009/0172800 A1* | 7/2009 | Wool | G06F 21/604 |
| | | | 726/11 |
| 2009/0198707 A1* | 8/2009 | Rohner | H04L 63/1408 |
| 2010/0100954 A1* | 4/2010 | Yang | H04L 63/0263 |
| | | | 726/11 |
| 2014/0164595 A1* | 6/2014 | Bray | H04L 43/06 |
| | | | 709/224 |
| 2018/0176185 A1* | 6/2018 | Kumar | H04L 63/0236 |
| 2021/0173851 A1* | 6/2021 | Dome | G06F 16/9532 |

* cited by examiner

SYSTEM AND METHOD FOR CREATING BUFFERED FIREWALL LOGS FOR REPORTING

TECHNICAL FIELD

The present disclosure relates generally to firewall systems for data networks, and more specifically to a system and method to create buffered firewall logs for reporting.

BACKGROUND OF THE INVENTION

Firewall systems generate logs of data that are periodically analyzed to identify threats. Due to the amount of data that is stored for such purposes, the data storage and data processing costs can be significant.

SUMMARY OF THE INVENTION

A system for firewall data log processing is disclosed that includes a firewall logging system operating on a first processor that is configured to cause the first processor to receive firewall log data and to process the firewall log data on a periodic basis to reduce the size of the firewall log data. A firewall reporting system operates on a second processor and is configured to process the reduced size firewall log data to generate a report on a user interface that includes one or more analytics from the reduced size firewall data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
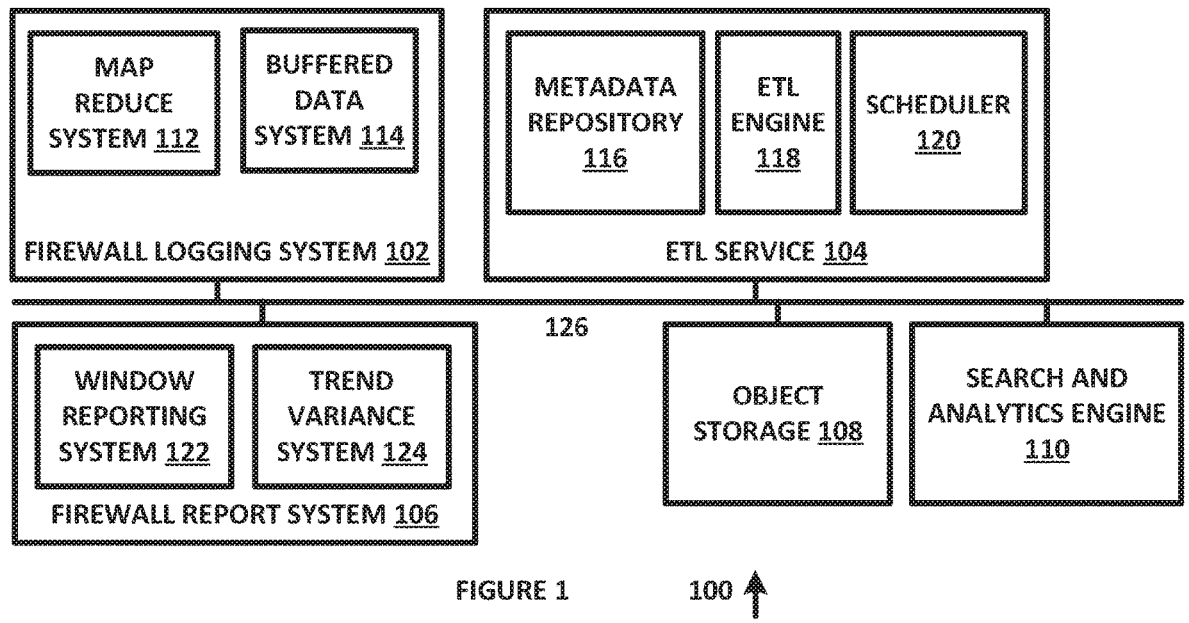
FIG. 1 is a diagram of a system for creating buffered firewall logs for reporting, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Firewalls collect data over time to analyze the data, for the purposes of identifying potential threats. Collecting a large set of these firewall data logs for fixed periods of time (such as 1 month to over a year) requires a large amount of data storage. Most enterprises use a cloud-based storage facility for these purposes, at great cost. It is also necessary to apply complex mathematical operations on this data, such as to identify potentially hostile third party activities, and this processing requires a substantial amount of computational resources and thus can also be expensive. The firewall log data is generated in near real-time, such that the flow of data is constant but varies in quantity.

Using a map-reduce algorithm, it is possible to create buffered batches of data, attributing the buffers to a fixed interval (such as 15 minute periods). This process can be used to create a set of time series data, which can be processed using computationally-intensive operations, such as averaging, aggregations, generation of standard deviations and so forth, to create intervals of processed data. Because the intervals of processed data are continuously generated instead of processing larger sets of data on demand, the processing cost can be lower. Storing the intervals of processed data reduces the overall complexity and cost of maintaining and analyzing such firewall data.

Various cloud technologies like AWS Glue and Amazon ElasticSearch are used for other unrelated purposes, but can be modified to perform these firewall log data processing operations. The ability to build firewall data analysis reports using this functionality allows trends and variances in the data to be identified over periods of time. The present disclosure also provides a sliding window user interface, which can be used to see data, trends and variances within user-selectable intervals over time.

In the following discussion, a system and method for providing a log aggregation architecture, data structure, data processing, data storage, tenant separation, reporting aggregations, data lookups and a development environment are provided, in accordance with example embodiments of the present disclosure. In these example embodiments, log records for firewall events can be generated multiple times per second, and the present disclosure provides a mechanism that simplifies the quantity of records that need to be analyzed and stored, and is also extendable for reporting and other functions. In particular, the present disclosure allows a firewall system that is operating on a first processor or group of processors, such as a data center, to utilize a second set of processors, such as a second data center, to process firewall log data, such as using an existing general purpose data analytics system. In this manner, the firewall system does not need to be modified to obtain the benefit of advanced data analytics, and instead the optimized general purpose data analytics can be applied to the unmodified firewall log data. In this manner, new data analytics processes for improving the detection of statistics or trends in the firewall log data can be employed without the need to modify an existing firewall log data processing system. In addition, a reporting system operating on a third data center can obtain the processed firewall log data and generate user reports, to allow the processed firewall log data to be more readily analyzed. For example, a window reporting system can be implemented that allows subsets of processed firewall log data to be presented in window reports that can be easily modified by a user to allow potential problems to be more readily identified. In this manner, each of the three separate data centers can operate independently, and can be independently modified without impacting the function of the other data centers, which reduces the operational costs, provides additional flexibility and also improves the data security of the overall system.

Backbone capabilities are provided by the disclosed system and method that enable the processing of large amounts of data, such as multi-terabyte data sets. The processing can be performed in parallel using scalable infrastructure in a reliable, fault-tolerant manner. Aggregations of the processed data, such as sums, counts, maximums, arithmetic operations and so forth, can be provided in a flexible manner using the systems and methods of the present disclosure, without the need to manage a large and complicated infrastructure.

A cloud-based service such as the Amazon Web Services (AWS) Glue Data Catalog can be used to store metadata from raw data logs, such as by using the AWS Glue Crawler Nightly to gather the metadata. The metadata can be used to populate the AWS Glue Data Catalog with the fields. The AWS Glue PySpark Job Build can be used to implement an Apache Spark job using the data catalog metadata to output aggregated data sets for predetermined periods of time. Elasticsearch can be used to store the aggregations of the output from the PySpark job.

In regards to the data structure, data can be output following denormalization, such as described in Elasticsearch denormalization resources, from the aggregated data frames in Apache Spark. The present disclosure can be used to create one Apache Spark job per report on the user interface mockups, or other suitable processes.

Each PySpark job can have its own output data, which can be stored in a Glue Data Catalog (format) and be changed on demand. The aggregations can include one or more of a SUMMARY_DASHBOARD, TRAFFIC_SUMMARY, APPLICATION_USAGE, WEB_SUMMARY, BLOCKED_THREATS, SUSPICIOUS_TRAFFIC and FILE_TRANSFERS, or other suitable aggregations.

Data processing can be implemented using exactly-once processing, which means that when the raw data logs are pulled in, the AWS Glue Bookmarks can be used to track the last processed record, such as described in AWS Glue support documentation. For Amazon S3 input sources, AWS Glue job bookmarks can be used to check the last modified time of the objects, to verify which objects need to be reprocessed. If the input source data has been modified since the last job run, the files can be reprocessed when the job is run again. This bookmark reference can be stored in an external storage, to allow it to be redeployed. The following is an example script for processing logs:

```
import sys
import elasticsearch
import json
from awsglue.transforms import *
from awsglue.utils import getResolvedOptions
from pyspark.context import SparkContext
from pyspark.sql import SQLContext
from awsglue.context import GlueContext
from awsglue.job import Job
import boto3
from datetime import datetime
from elasticsearch import ElasticsearchException, helpers, RequestsHttpConnection
from elasticsearch.connection import create_ssl_context
from aws_requests_auth.aws_auth import AWSRequestsAuth
@params: [JOB_NAME]
args = getResolvedOptions(sys.argv, ['JOB_NAME'])
sc = SparkContext( )
glueContext = GlueContext(sc)
sqlContext = SQLContext(sc)
spark = glueContext.spark_session
job = Job(glueContext)
job.init(args['JOB_NAME'], args)
datasource0 =
glueContext.create_dynamic_frame.from_catalog(database = "dyn-use2-cpt-fa5000-log-ingestiondatabase",
table_name = "2019", transformation_ctx = "datasource0")
applymapping1 = ApplyMapping.apply(frame = datasource0,
mappings = [("dst", "string", "dst", "string"),
("src", "string", "src", "string"), ("kind", "string",
"kind", "string"), ("type.title", "string", "type.
title", "string"), ("node_id", "string", "node_id",
"string")], transformation_ctx = "<transformation_ctx>")
selectfields2 = SelectFields.apply(frame = applymapping1,
paths = ["dst", "src", "kind", "node_id"],
transformation_ctx = "selectfields2")
resolvechoice3 = ResolveChoice.apply(frame = selectfields2,
choice = "MATCH_CATALOG", database = "dyn-use2-cpt-fa5000-log-ingestion-database", table_name = "2019",
transformation_ctx = "resolvechoice3")
headers = {"Content-Type": "application/json"}
es_host = "search-es-cpt-use2-fa-3962-poc-f...m.us-east-2.es.amazonaws.com"
es_url = 'http://'+ es_host
es_service = 'es'
credentials = boto3.Session( ).get_credentials( )
def doc_generator(row):
 print "=>Source Starts!<="
 print list(row)
 print "=>Loop Starts!<="
 updated_row = json.dumps({'row': row})
 print "=>Row Starts!<="
 print updated_row
 print "=>Row Ends!<="
 index_name = "mandar-index-" +
(str(datetime.now( ))).replace(" ", "_")
 new_row = {
 '_index': index_name,
 '_type': 'cur',
 '_source': updated_row
 }
 yield new_row
def bulk_upload(record):
 print "=>Record!<="
 print record
 context = create_ssl_context(cafile=None, capath=None,
cadata=None)
 es_domain_url = es_url
 credentials = boto3.Session( ).get_credentials( )
 aws_auth_es =
AWSRequestsAuth(aws_access_key=credentials.access_key,
 aws_secret_access_key=credentials.secret_key,
 aws_host =es_host,
 aws_region='us-east-2',
 aws_service=es_service,
 aws_token=credentials.token)
 es = elasticsearch.Elasticsearch(
 hosts=[{'host': es_host, 'port': 443}],
 http_auth=aws_auth_es,
 use_ssl=True,
 verify_certs=True,
 connection_class=RequestsHttpConnection,
 timeout=60
 )
 try:
 result = helpers.bulk(
 es,
 doc_generator(record),
 stats_only=True,
 raise_on_error=True,
 raise_on_exception=True,
 max_retries=5,
 initial_backoff=20,
 chunk_size=1000
 )
 except ElasticsearchException as ex:
 print "bulk API error"
 print ex
 raise Exception(ex)
df1 = applymapping1.toDF( ).rdd
print "=>Data Frame Empty?<="
print df1.isEmpty( )
print "=>RDD<="
# print df1.take(100)
# words.foreach(bulk_upload)
```

```
for row in df1.take(4): bulk_upload(row)
print"=>Completed the job!!!<="
job.commit( )
```

In regards to data storage, an Elasticsearch index can be added each day, such as where each index can follow the format logs_YYYY-MM-DD (e.g. logs_2019-04-24) or in other suitable manners. A monthly index for logs can also be kept (e.g. logs_YYYY-MM), and these can be rolled-up on a SparkJob that runs on the first day of every month. A yearly index for logs (e.g. logs_YYYY) can also alternatively be kept, where suitable. These logs allow historical data to be stored so that it can be used for analysis, can save on the amount of time required to process a query, and can save on the cost of storing the log data as daily indices.

A monthly roll-up of daily indices can also be generated. The roll-up functionality can be implemented by re-indexing daily indices to a monthly index, and thereafter deleting the daily indices or in other suitable manners. This process can run on a nightly SparkJob or in other suitable manners. On the first day of every month, daily indices for the previous month can be rolled up into one index for that month, or other suitable processes can also or alternatively be performed. For example, logs_2019-03-01, logs_2019-03-02 through logs_2019-03-31 can be rolled up into one index, such as 2019_March_2019-01-03_2019-01-31.

Aggregations can be affected by this process. In one example embodiment, when a 'last 7 day' aggregation spans daily indices as well as a monthly index, the monthly index can be filtered on the date field to retrieve documents for the dates in question only, and this filtered data can be combined with the respective daily indices. An example script for a monthly roll-up is shown below:

```
import boto3
import datetime
import calendar
import json
from elasticsearch import Elasticsearch,
RequestsHttpConnection
from aws_requests_auth.aws_auth import AWSRequestsAuth
current_day = datetime.date(2019,4,1)
#datetime.datetime.utcnow( )
first = current_day.replace(day=1)
lastMonth = first – datetime.timedelta(days=1)
lastMonth_str = str(lastMonth.year) + '_'          +
(lastMonth.strftime("%B")).lower( ) + '_'
lastMonth_nr_days = calendar.monthrange(lastMonth.year,
lastMonth.month)[1]
def can_run_report( ):
if (current_day.day == 1):
return True
return False
def execute_reindex_monthly(daily_indices, es):
indices = '"' + '","'.join(daily_indices) + '"'
print('-- Re-indexing indices --\nIndices: '+ indices)
new_index = lastMonth_str + daily_indices[0] + '_'      +
daily_indices[-1]
if es.indices.exists(index=new_index):
print('Monthly index "' + new_index + '" already exists')
return False
reindex_json = '{ "source": { "index": [' + indices + ']},
"dest": { "index": "' + new_index + '"}}'
try:
response = es.reindex(reindex_json)
print('Response: ' + json.dumps(response))
return True
except Exception as e:
print ('Error ' + str(e))
return False
def execute_delete(daily_indices, es):
indices =','.join(daily_indices)
print('--Deleteing indices --\nIndices: '+ indices)
try:
response = es.indices.delete(index=indices, ignore=[400,
404])
print('Response: ' + json.dumps(response))
return True
except Exception as e:
print('Error' + str(e))
return False
def get_daily_logs(es):
indices = [ ]
for i in range(1,lastMonth_nr_days+1):
i_index = 'logs_'+ str(lastMonth.year) + '–'          +
'{:02}'.format(lastMonth.month) + '–' + '{:
02}'.format(i)
exists_response = es.indices.exists(index=i_index)
if (exists_response):
indices.append(i_index)
print('>Daily indices for ' + lastMonth_str +': '       +
str(indices))
return indices
def main( ):
if not can_run_report( ):
print('Today is not the first day of the month, cannot run
report')
return
headers = {"Content-Type": "application/json"}
es_host = "search-es-cpt-use2-fa-3962-poc-f...m.us-east-
2.es.amazonaws.com"
es_url = 'http://'+ es_host
es_service = 'es'
credentials = boto3.Session( ).get_credentials( )
aws_auth_es                                            =
AWSRequestsAuth(aws_access_key=credentials.access_key,
aws_secret_access_key=credentials.secret_key,
aws_host =es_host,
aws_region='us-east-2',
aws_service=es_service,
aws_token=credentials.token )
es = Elasticsearch( hosts=[{'host': es_host, 'port': 443}],
http_auth=aws_auth_es,
use_ssl=True,
verify_certs=True,
connection_class=RequestsHttpConnection,
timeout=60)
daily_indices = get_daily_logs(es)
response = False
if (len(daily_indices) > 0) :
# Reindex daily data to monthly
response = execute_reindex_monthly(daily_indices,es)
if response:
# Delete daily data
execute_delete(daily_indices,es)
if __name__ == '__main__':
main( )
```

To separate tenants (groups of user that share common access), a route can be added as a function of a tenantId in Elasticsearch: Calculation: shard=hash(routing) % number_of_primary_shards. Document application programming interfaces (APIs) (such as get, index, delete, bulk, update, and mget) can accept a routing parameter that can be used to customize the document-to-shard mapping. A custom routing value can be used to ensure that related documents (e.g. documents belonging to the same tenant) are stored on the same shard. Because small shards result in small segments, which increases overhead, the average shard size can be maintained between at least a few gigabytes and a few tens of gigabytes. The overhead per shard when Elastisearch is used can be a function of the segment count and size, which can cause smaller segments to merge into larger ones if a forcemerge operation is used to reduce overhead and improve query performance. This process can be done once no more data is written to the index, and is a computationally expensive operation that can be performed during off-peak hours or at other suitable times.

The number of shards that can be held on a node can be proportional to the amount of heap that is available, but there is no fixed limit enforced by Elasticsearch. The number of shards per node is typically kept below 20 per GB heap that has been configured. A node with a 30 GB heap could thus have a maximum of 600 shards, staying below this limit will generally help the cluster perform better. To report aggregations in Elasticsearch, aggregations can be built across multiple indices, and queries can be updated to match the new indices structures.

For data lookups, additional catalogs can be added for mapping of data. This process can be implemented as an external request to get a list of sites or tenants. For a development environment, an Apache Zepplin notebook can be set up and configured through AWS Glue so for debugging. Available resources can be used to abstract aggregations and make it easier to write reports. Aggregations can be stored as configuration and dynamically loaded on a nightly basis or in other suitable manners. Dummy data records can be at different levels, such as per tenant if no logs exist. As indices increase in size, the logic can be extracted into weekly indices if required, to simplify the queries in the aggregations. One daily index can be used for all reports.

FIG. 1 is a diagram of a system 100 for creating buffered firewall logs for reporting, in accordance with an example embodiment of the present disclosure. System 100 includes firewall logging system 102, extract/transform/load (ETL) service 104, firewall report system 106, object storage system 108, search and analytics system 110, map reduce system 112, buffered data system 114, metadata repository 116, ETL engine 118, scheduler 120, window reporting system 122, trend variance system 124 and network 126, each of which can be implemented in hardware or a suitable combination of hardware and software.

Firewall logging system 102 can be implemented as one or more algorithms that are loaded into working memory of a processor and which are configured to cause the processor to perform the functions of generating logs of data captured during network interactions. In one example embodiment, the logs of data can be associated with individual workstations, where each workstation has its own associated data log. In addition, the logs of data can identify a user associated with the work station, websites accessed by the work station, data transmitted and received by the work station and other suitable data.

ETL service 104 can be implemented as one or more algorithms that are loaded into working memory of a processor and which are configured to cause the processor to perform the functions of extracting, transforming and loading data from firewall logs. In one example embodiment, ETL service 104 can be the AWS Glue ETL service or other suitable ETL services that can process large firewall log data sets to identify subsets of related data within the large data sets, and which can receive periodic file downloads of firewall log data and process those periodic file downloads based on the subsets, such as for individual users, for groups of users or in other suitable manners. ETL service 104 can process the data to generate sets of data that are stored in object storage 108 and other suitable data.

Firewall report system 106 can be implemented as one or more algorithms that are loaded into working memory of a processor and which are configured to cause the processor to perform the functions of generating user interface controls to allow a user to select firewall report criteria and to receive and view the associated firewall reports. In one example embodiment, firewall report system 106 can generate controls that allow a user to select a workstation, a user that is associated with the workstation or other suitable classes of monitored devices or entities, and controls that allow the user to select a specific period of time, a specific window within a period of time, a specific activity or other suitable report criteria. Firewall report system 106 can interface with search and analytics engine 110 and object storage 108 to obtain the requested reports.

Object storage system 108 can be implemented as one or more algorithms that are loaded into working memory of a processor and which are configured to cause the processor to perform the functions of receiving and storing data generated by ETL service 104. In one example embodiment, ETL service 104 can be configured to receive firewall logs from firewall logging system 102 and to generate metadata objects that are stored in object storage system 108.

Search and analytics system 110 can be implemented as one or more algorithms that are loaded into working memory of a processor and which are configured to cause the processor to perform the functions of performing searching and analysis of data stored in object storage system 108. In one example embodiment, search and analytics system 110 can receive control data from firewall report system 106 and can perform search and analysis functions on data stored in object storage system 108, such as to select firewall metadata for a predetermined user, a predetermined workstation, a predetermined period of time or other suitable controls, to generate report data and to transmit the report data back to firewall report system 106.

Map reduce system 112 can be implemented as one or more algorithms that are loaded into working memory of a processor and which are configured to cause the processor to perform the functions of receiving real-time firewall data and generating buffered batches of firewall data. In one example embodiment, map reduce system 112 can attribute the buffers to a fixed interval (such as 15 min periods), or can perform other suitable functions.

Buffered data system 114 can be implemented as one or more algorithms that are loaded into working memory of a processor and which are configured to cause the processor to perform the functions of receiving and storing buffered batches of data from map reduce system 112 or other suitable systems.

Metadata repository 116 can be implemented as one or more algorithms that are loaded into working memory of a processor and which are configured to cause the processor to perform the functions of allocating metadata to predetermined storage facilities. In one example embodiment, the metadata can be associated with one or more workstations, one or more users, one or more organizations or other suitable entities, where each entity can have an associated metadata schema that the metadata is stored in by metadata repository 116.

ETL engine 118 can be implemented as one or more algorithms that are loaded into working memory of a processor and which are configured to cause the processor to perform the functions of automatically generating code associated with an organization, workstation, user or other suitable entities. In one example embodiment, the code can include Python code, Scala code or other code that is configured to facilitate interaction with metadata generated by ETL service 104.

Scheduler 120 can be implemented as one or more algorithms that are loaded into working memory of a processor and which are configured to cause the processor to perform the functions of identifying and resolving dependency issues, monitoring the progress and completion of jobs, initiating retries and other suitable functions.

Window reporting system 122 can be implemented as one or more algorithms that are loaded into working memory of a processor and which are configured to cause the processor to perform the functions of generating a user interface that includes one or more controls that allow a user to select a firewall data reporting window. In one example embodiment, the reporting window can specify a period of time for the firewall data, can allow a user to see a user interface with a sliding window that facilitates review of the firewall data or can provide other suitable functions. In another example embodiment, window reporting system 122 can generate a user interface that includes one or more user controls that allow a user to specify a window size based on a time period that the window should cover, a window location along a time line or other suitable user controls.

Trend variance system 124 can be implemented as one or more algorithms that are loaded into working memory of a processor and which are configured to cause the processor to perform the functions of trends and variances in the firewall data over periods of time. In one example embodiment, trend variance system 124 can receive a user input specifying a period of time and can identify patterns or indicators in the firewall data, such as an increase or decrease in frequency of events, an increase or decrease in a total volume of events, deviations in predetermined data values or other suitable functions.

Network 126 can be one or more of a wireline network, a wireless network, an optical network or other suitable networks that allow workstations in an enterprise to access an external system through a firewall, and that allow external systems to access workstations in an enterprise through the firewall.

Figure 2:
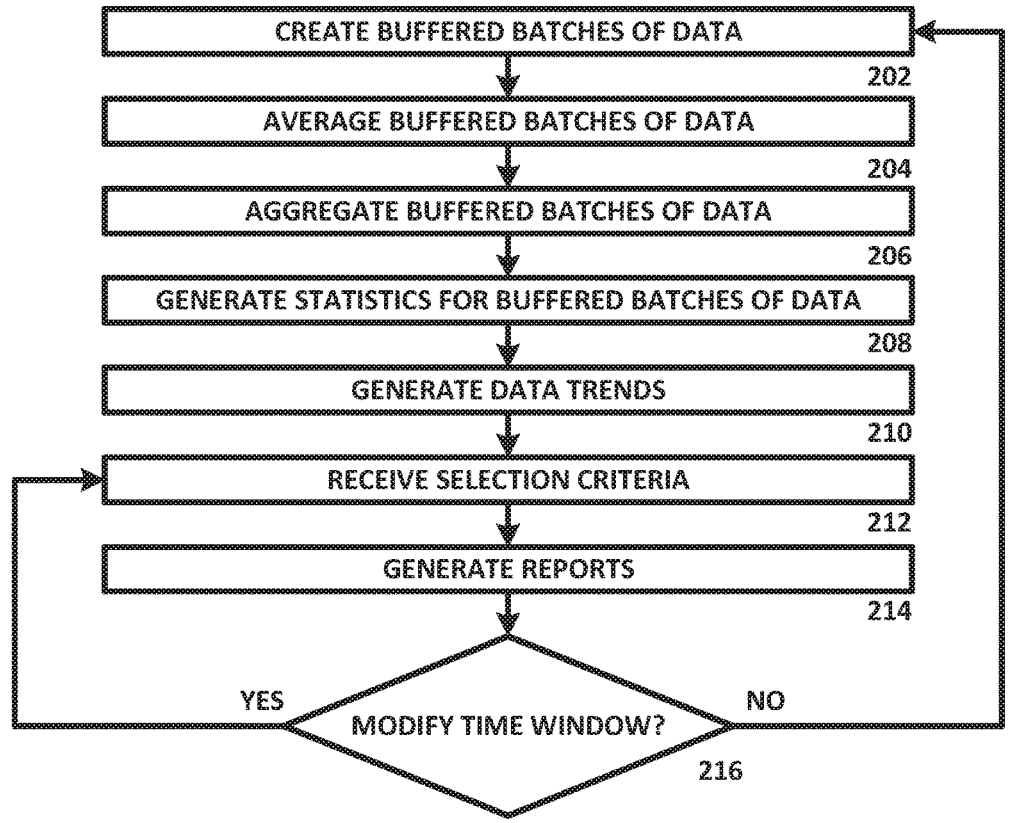
FIG. 2 is a diagram of an algorithm for creating buffered firewall logs for reporting, in accordance with an example embodiment of the present disclosure.

FIG. 2 is a diagram of an algorithm 200 for creating buffered firewall logs for reporting, in accordance with an example embodiment of the present disclosure. Algorithm 200 can be implemented on one or more processors.

Algorithm 200 begins at 202, where buffered batches of firewall data are created. In one example embodiment, the buffered batches of firewall data can be created using the disclosed system to reduce the firewall data by identifying one or more types of data, types of entities or other suitable classifiers for reducing the amount of data that needs to be stored over a period of time, by using an ETL service to process the data, or in other suitable manners. The algorithm then proceeds to 204.

At 204, the buffered batches of firewall data are averaged. In one example embodiment, one or more data fields, objects or other components of the buffered batches of firewall data can be averaged to generate statistics that can be used for reporting purposes, or other suitable functions can also or alternatively be performed. The algorithm then proceeds to 206.

At 206, the buffered batches of data are aggregated. In one example embodiment, one or more data fields, objects or other components of the buffered batches of firewall data can be aggregated to generate reports, or other suitable functions can also or alternatively be performed. The algorithm then proceeds to 208.

At 208, statistics are generated for the buffered batches of data. In one example embodiment, statistics can be generated for one or more data fields, objects or other components of the buffered batches of firewall data for reporting purposes, or other suitable functions can also or alternatively be performed. The algorithm then proceeds to 210.

At 210, data trends are generated for the buffered batches of data. In one example embodiment, data trends can be generated for predetermined intervals over a predetermined period of time, such as for 15 minute intervals over weeks or months, or in other suitable manners. The algorithm then proceeds to 212.

At 212, a selection criteria is received. In one example embodiment, receiving the selection criteria can include generating one or more user interface controls that allow a user to select a terminal for display in the selection window, where the firewall data for that terminal is obtained and processed to generate the display, to allow the user to review the statistics for that terminal, the data trends for that terminal or other suitable data. In another example embodiment, the user interface controls can allow the user to control the period of time associated with a report, a window control or other suitable periods of time, a location of a window control along a time line, or other suitable user interface controls. The algorithm then proceeds to 214.

At 214, reports are generated. In one example embodiment, reports can be generated in real time, in response to requests from a user that identify specific workstations, users of workstations, enterprises or other suitable entities. The reports can be generated in an interactive user interface that includes one or more controls, such as a windowing control that allows a time window to be changed, such as by sliding the window over a time period, by changing the size of the time window or in other suitable manners. The algorithm then proceeds to 216.

At 216, it is determined whether a time window has been modified. In one example embodiment, a user control can be generated in a user interface that allows a user to change the time window parameters, such as a terminal associated with a time window report, a size of the time window, a period of the time window or other suitable parameters. The user can "slide" the timer window in the user interface, such as by activating a first control that allows a window graphic to be moved and by periodically updating the data associated with the time window to generate statistics, trends or other suitable data. If it is determined that time window has not been modified, the algorithm returns to 202, otherwise the time widow parameters are updated and the algorithm returns to 212.

In operation, algorithm 200 can create buffered firewall logs for reporting or other suitable functions. Although algorithm 200 is shown as a flow chart, a person of skill in the art will recognize that algorithm 200 can also or alternatively be implemented using object-oriented programming, state diagrams, ladder diagrams or other suitable programming paradigms.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for firewall data log processing, comprising:
 a firewall logging system operating on a first processor and being a hardware processor and having a memory configured to execute components of the hardware processor to cause the first processor to receive firewall log data and to process the firewall log data on a periodic basis to reduce a size of the firewall log data;
 a firewall reporting system operating on a second processor and configured to process the reduced size firewall log data to generate a report on a user interface that includes one or more analytics from the reduced size firewall data; and
 an extract, transform and load service operating on a third processor and configured to extract two or more subsets of data from the firewall log data, to transform the extracted firewall log data into a metadata schema and to load the metadata schema into a data processing system configured to analyze the firewall log data using the metadata schema.

2. The system of claim 1 wherein the extract, transform and load service further comprises a metadata repository configured to receive the metadata schema and to store the metadata schema.

3. The system of claim 1 wherein the extract, transform and load service further comprises a scheduler configured to periodically process an update using the metadata schema.

4. The system of claim 1 wherein the firewall reporting system comprising a window reporting system operating on the second processor and configured to generate a window user interface display for selecting a predetermined period of time.

5. The system of claim 1 wherein the firewall reporting system comprising a window reporting system operating on the second processor and configured to generate a window user interface display for relocating a display for a predetermined period of time.

6. The system of claim 1 wherein the firewall reporting system comprising a window reporting system operating on the second processor and configured to generate a window user interface display for relocating a display of firewall statistics for a predetermined period of time.

7. The system of claim 1 wherein the firewall reporting system comprising a window reporting system operating on the second processor and configured to generate a window user interface display for relocating a display of firewall statistics for a predetermined user for a predetermined period of time.

8. The system of claim 1 wherein the extract, transform and load service further comprises a scheduler configured to periodically process an update using the metadata schema.

9. The system of claim 1 wherein the extract, transform and load service further comprises:
a metadata repository configured to receive the metadata schema and to store the metadata schema; and
a scheduler configured to periodically process an update using the metadata schema.

10. A method for firewall data log processing, comprising:
receiving firewall log data using one or more first algorithms at a first processor that is configured to load and execute the one or more algorithms;
processing the firewall log data on a periodic basis to reduce a size of the firewall log data using the one or more first algorithms and the first processor;
processing the reduced size firewall log data using one or more second algorithms at a second processor to generate a report on a user interface that includes one or more analytics from the reduced size firewall data; and
extracting two or more subsets of data from the firewall log data using one or more third algorithms operating on a third processor, to transform the extracted firewall log data into a metadata schema and to load the metadata schema into a data processing system that is configured to analyze the firewall log data using the metadata schema.

11. The method of claim 10 further comprising receiving the metadata schema and storing the metadata schema.

12. The method of claim 10 further comprising periodically process an update using the metadata schema.

13. The method of claim 10 further comprising generating a window user interface display for selecting a predetermined period of time for a report.

14. The method of claim 10 further comprising generating a window user interface display for relocating a display for reporting data for a predetermined period of time.

15. The method of claim 10 further comprising generating a window user interface display for relocating a display for reporting firewall statistics for a predetermined period of time.

16. The method of claim 10 further comprising generating a window user interface display for relocating a display of firewall statistics for a predetermined user for a predetermined period of time.

17. The method of claim 10 further comprising periodically processing an update using the metadata schema.

18. A system for firewall data log processing, comprising:
a firewall logging system operating on a first processor and being a hardware processor and having a memory configured to execute components of the hardware processor to cause the first processor to receive firewall log data and to process the firewall log data on a periodic basis to reduce a size of the firewall log data;
a firewall reporting system operating on a second processor and configured to process the reduced size firewall log data to generate a report on a user interface that includes one or more analytics from the reduced size firewall data; and
an extract, transform and load service operating on a third processor and configured to extract two or more subsets of data from the firewall log data, to transform the extracted firewall log data into a metadata schema and to load the metadata schema into a data processing system configured to analyze the firewall log data using the metadata schema.

19. The system of claim 18 wherein the extract, transform and load service further comprises a metadata repository configured to receive the metadata schema and to store the metadata schema.

20. The system of claim 18 wherein the extract, transform and load service further comprises a scheduler configured to periodically process an update using the metadata schema.

* * * * *